(12) United States Patent
Su

(10) Patent No.: US 7,177,147 B2
(45) Date of Patent: Feb. 13, 2007

(54) HEAT DISSIPATION DEVICE FOR COMPUTER HARD DRIVE

(75) Inventor: Steven Su, Taoyuan (TW)

(73) Assignee: Enermax Technology Corporation, Taoyuan (TW)

( * ) Notice: Subject to any disclaimer, the term of this patent is extended or adjusted under 35 U.S.C. 154(b) by 0 days.

(21) Appl. No.: 11/070,227

(22) Filed: Mar. 3, 2005

(65) Prior Publication Data

US 2006/0171114 A1    Aug. 3, 2006

(51) Int. Cl.
*G06F 1/20*      (2006.01)
(52) U.S. Cl. ........................ 361/687; 361/685; 248/618
(58) Field of Classification Search ................ 361/685, 361/687; 248/633–638, 618
See application file for complete search history.

(56) References Cited

U.S. PATENT DOCUMENTS

| 5,510,954 | A | * | 4/1996 | Wyler | 361/685 |
| 5,596,483 | A | * | 1/1997 | Wyler | 361/687 |
| 6,005,768 | A | * | 12/1999 | Jo | 361/685 |
| 6,154,360 | A | * | 11/2000 | Kaczeus et al. | 361/685 |
| 6,560,097 | B2 | * | 5/2003 | Naruo et al. | 361/685 |
| 6,673,460 | B2 | * | 1/2004 | Imai et al. | 361/685 |
| 6,781,829 | B2 | * | 8/2004 | Hein | 361/687 |
| 2002/0097556 | A1 | * | 7/2002 | Lee | 361/685 |
| 2003/0035267 | A1 | * | 2/2003 | Searls et al. | 361/687 |
| 2004/0174673 | A1 | * | 9/2004 | Lin | 361/687 |
| 2004/0207980 | A1 | * | 10/2004 | Kobayashi | 361/685 |
| 2006/0023418 | A1 | * | 2/2006 | Solomon et al. | 361/687 |

* cited by examiner

*Primary Examiner*—Lisa Lea-Edmonds
(74) *Attorney, Agent, or Firm*—Troxell Law Office, PLLC

(57) ABSTRACT

A computer hard drive heat dissipation device for a fixed, swappable or externally connectable hard drive is provided. A heat socket is provided inside a metallic housing, and a heat board is provided on the bottom of the metallic housing. A contact surface where the heat socket and the heat board contact the hard drive, corresponding to a hard drive heat source, is provided with a high heat conductive material or a high heat conductive medium capable of absorbing vibration, enhancing quantitative fit, and conducting heat. The hard drive contact surface and its surrounding space are provided with vibration absorption and sound absorption materials respectively so as to obtain good capabilities in heat dissipation, vibration absorption and sound absorption.

15 Claims, 6 Drawing Sheets

HEAT DISSIPATION DEVICE FOR COMPUTER HARD DRIVE

BACKGROUND OF THE INVENTION

Since electronics and information-related technologies have been continuously improved, the data to be processed by computers and their memory devices have also increased. The processor speed has also increased beyond the imagination of human beings; therefore, people have to face having to work in an overheating computer system environment. Among all computer components, the primary heat sources are from CPUs, power supplies and hard drives.

Among the above mentioned heat sources, namely the CPU, the power supply and the hard drive, the hard drive is the most vulnerable to an overheated situation. If the hard drive becomes overheated, it will be damaged and the important data saved therein will be lost, resulting in unrecoverable damage to the computer. Therefore, how to keep the hard drive under an acceptable temperature range is very important to computer product designers and manufacturers.

Among computer overheating problems, heat dissipation for the CPU and the power supply has been improved with great efforts from the industry. For example, the CPU is applied with a metallic heat-absorbing piece with fans added to solve the overheating problem. On the other hand, due to the internal structural and space limitations, the power supply is designed with corresponding fans to improve air convection so as to assist heat dissipation. Among the three above-mentioned heat-generating mechanisms, the hard drive is the one with the least effective improvement on heat dissipation. This is because the hard drive is a high heat source and is limited by the structural space of the various hard drives.

Three kinds of hard drives are currently used in a computer. One is to fix the hard drive in the hard drive bay in the computer system; another is similarly disposed in the hard drive bay in the computer system but can be swapped with a hard drive case; the other is to externally connect the hard drive outside the computer system using a USB connector. Because the structural design is less than perfect, the heat dissipation function for each is not ideal.

Based on the drawbacks caused by the limited space provided in the various conventional hard drive devices and the heat dissipation problem, the inventor develops a computer hard drive heat dissipation device. Through a special heat dissipation design, the present invention can be used for a fixed, swappable, and externally connectable hard drive. The housing of the computer hard drive is metallic housing, and is disposed with a heat socket inside. The bottom of the metallic housing is provided with a heat board. A contact surface where the heat socket and the heat board contact the hard drive, corresponding to a computer heat source, is provided with a soft high heat conductive material or a high heat conductive medium capable of absorbing vibration, enhancing qualitative fit, and conducting heat. The contact surface of the hard drive and the surrounding space are provided with vibration absorption and sound absorption materials respectively so as to obtain great capabilities in heat dissipation, vibration absorption and sound absorption.

SUMMARY OF THE INVENTION

The present invention provides a computer hard drive heat dissipation device for use with a fixed, swappable, or externally connectable hard drive. The present invention is characterized in that a heat socket is disposed inside a metallic housing. A contact surface where the heat socket and the heat board contact the hard drive, corresponding to a hard drive heat source, is provided with a high heat conductive material or a high heat conductive medium capable of absorbing vibration, enhancing qualitative fit, and conducting heat. The high heat conductive silicone on the contact surface between the heat socket, the heat board and the hard drive is surrounded with a vibration absorption material. The gap spaces surrounding the heat socket and the metallic housing are inserted with a sound absorption material so that heat generated during the running of the hard drive can be absorbed by the high heat conductive material or the high heat conductive medium as well as be conducted to the heat socket and the heat board so as to dissipate heat as well as absorb vibration and sound.

DETAILED DESCRIPTION OF THE DRAWINGS

DETAILED EMBODIMENTS OF THE INVENTION

Figure 1:
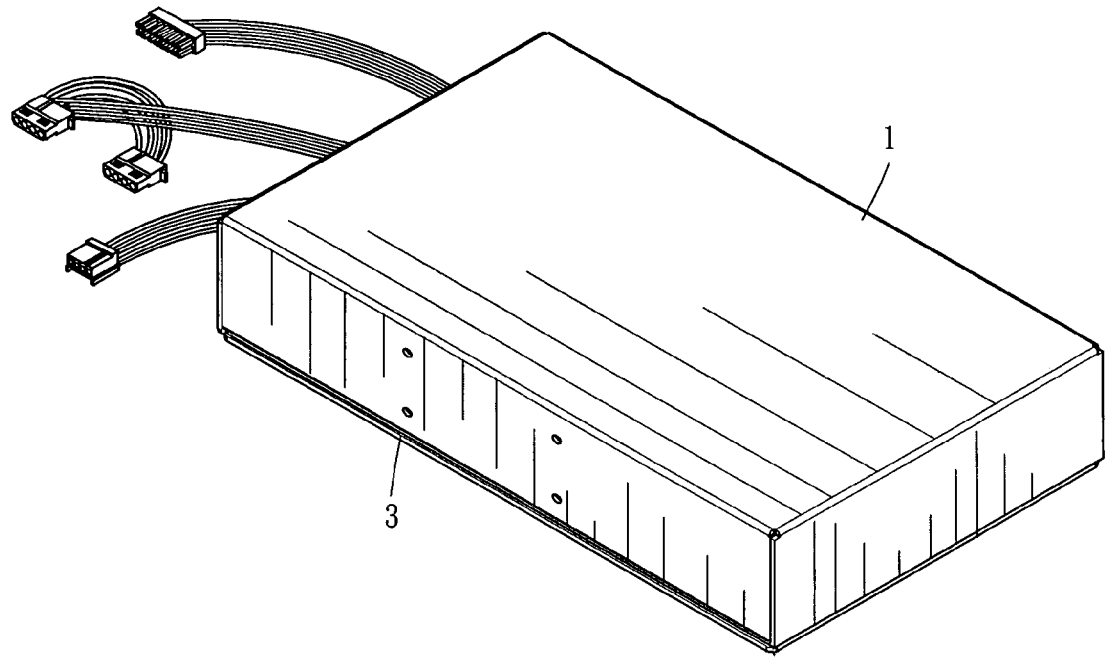
FIG. 1 is a three dimensional view of an embodiment applied to a fixed hard drive in accordance with the present invention.
Figure 2:
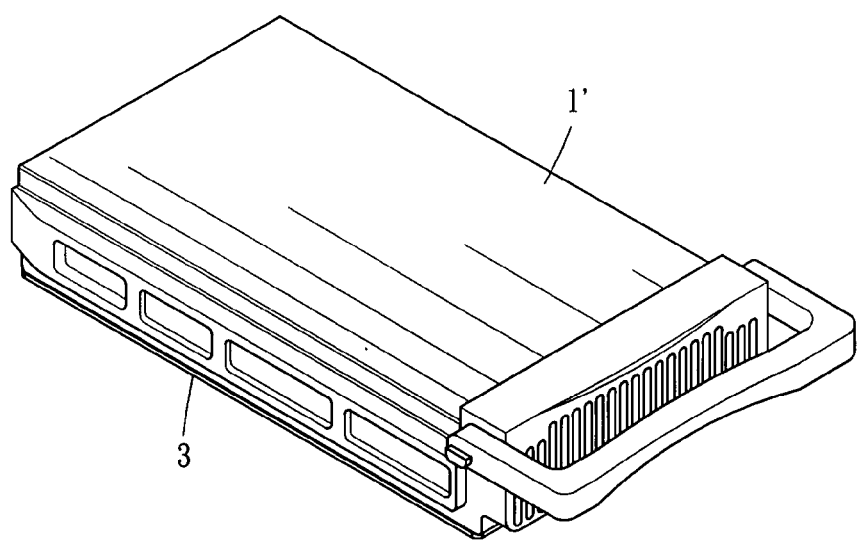
FIG. 2 is a three dimensional view of an embodiment applied to a swappable hard drive in accordance with the present invention.
Figure 3:
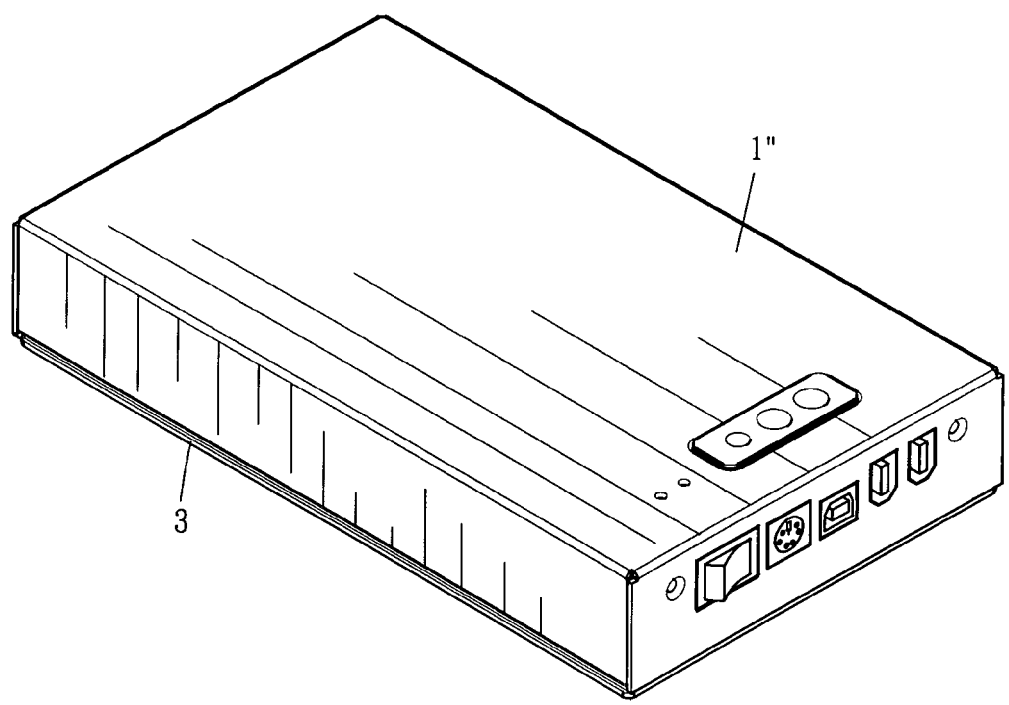
FIG. 3 is a three dimensional view of an embodiment applied to an externally connectable hard drive in accordance with the present invention.
Figure 4:
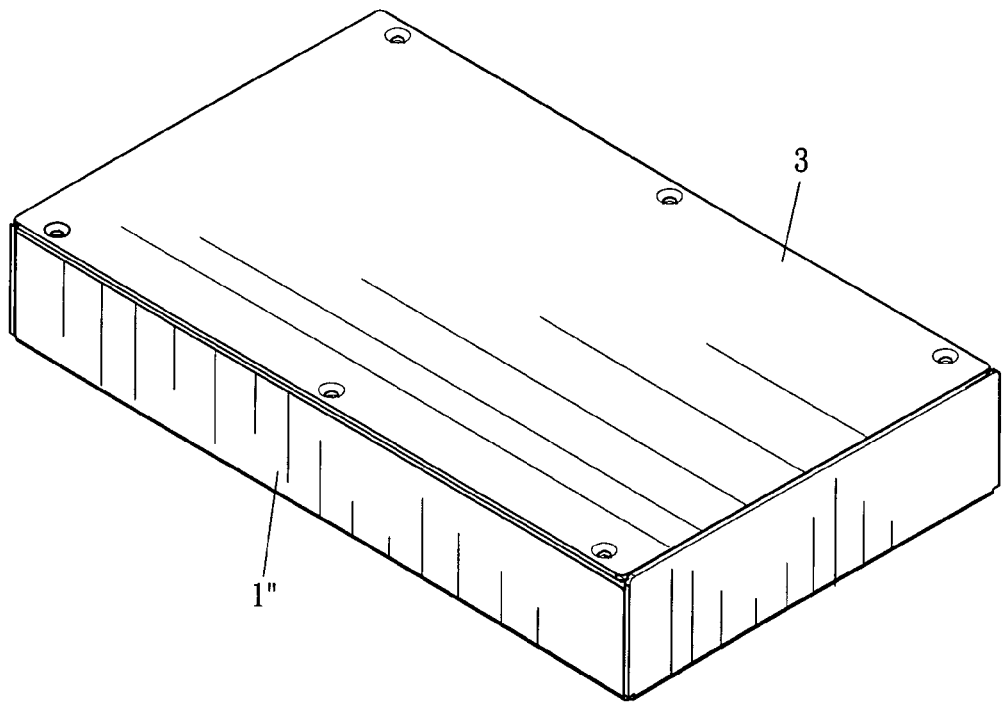
FIG. 4 is a bottom three dimensional view of FIG. 3 in accordance with the present invention.

Referring to FIGS. 1, 2, and 3, the computer hard drive heat dissipation device in accordance with the present invention includes a metallic housing 1, 1', 1" for a fixed (as shown in FIG. 1), swappable (as shown in FIG. 2), or externally connectable hard drive (as shown in FIG. 3 and FIG. 4), a heat socket 2 for affixing the hard drive, and a heat board 3.

Figure 5:
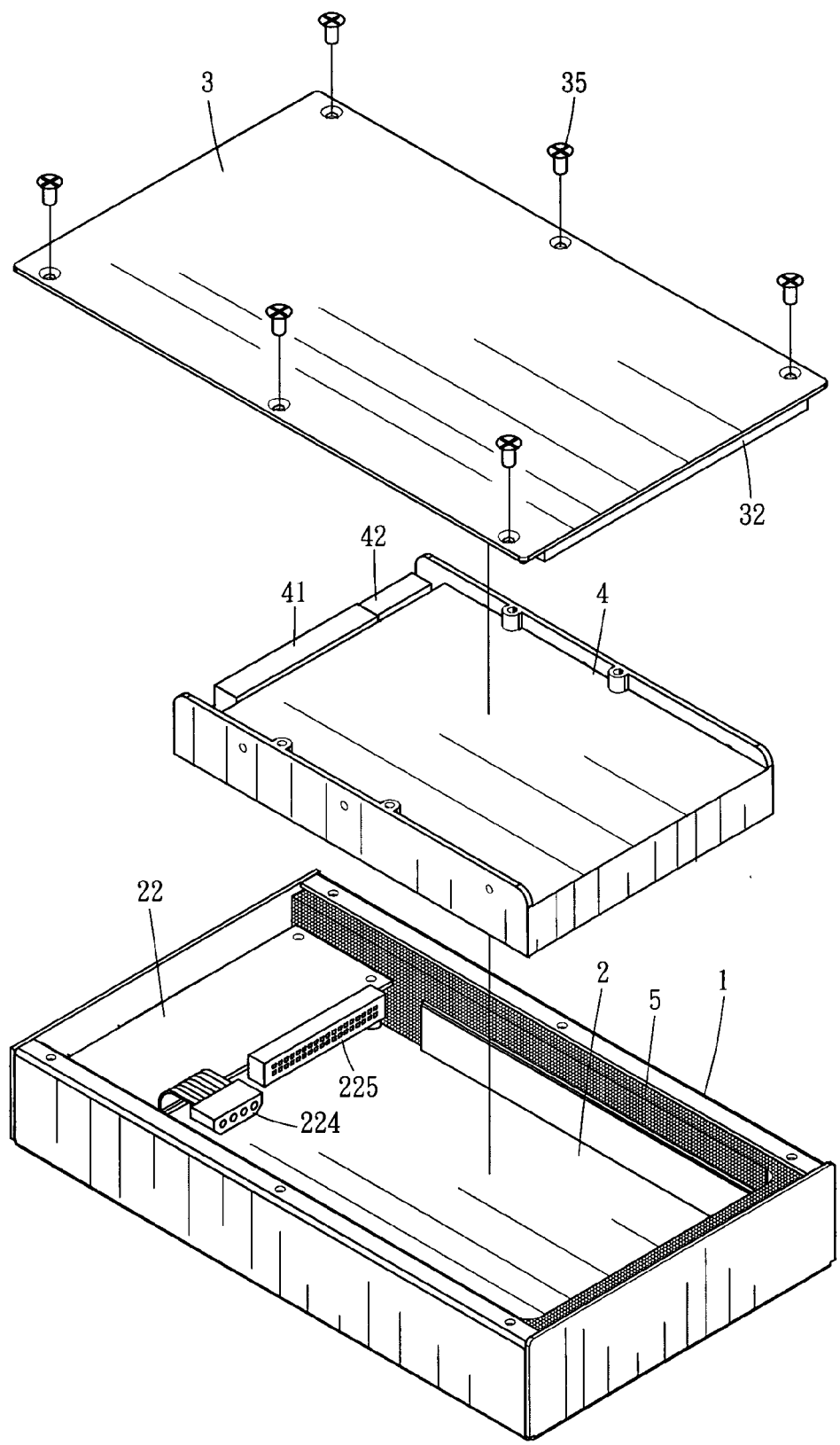
FIG. 5 is an exploded view of the main components of the present invention.
Figure 6:
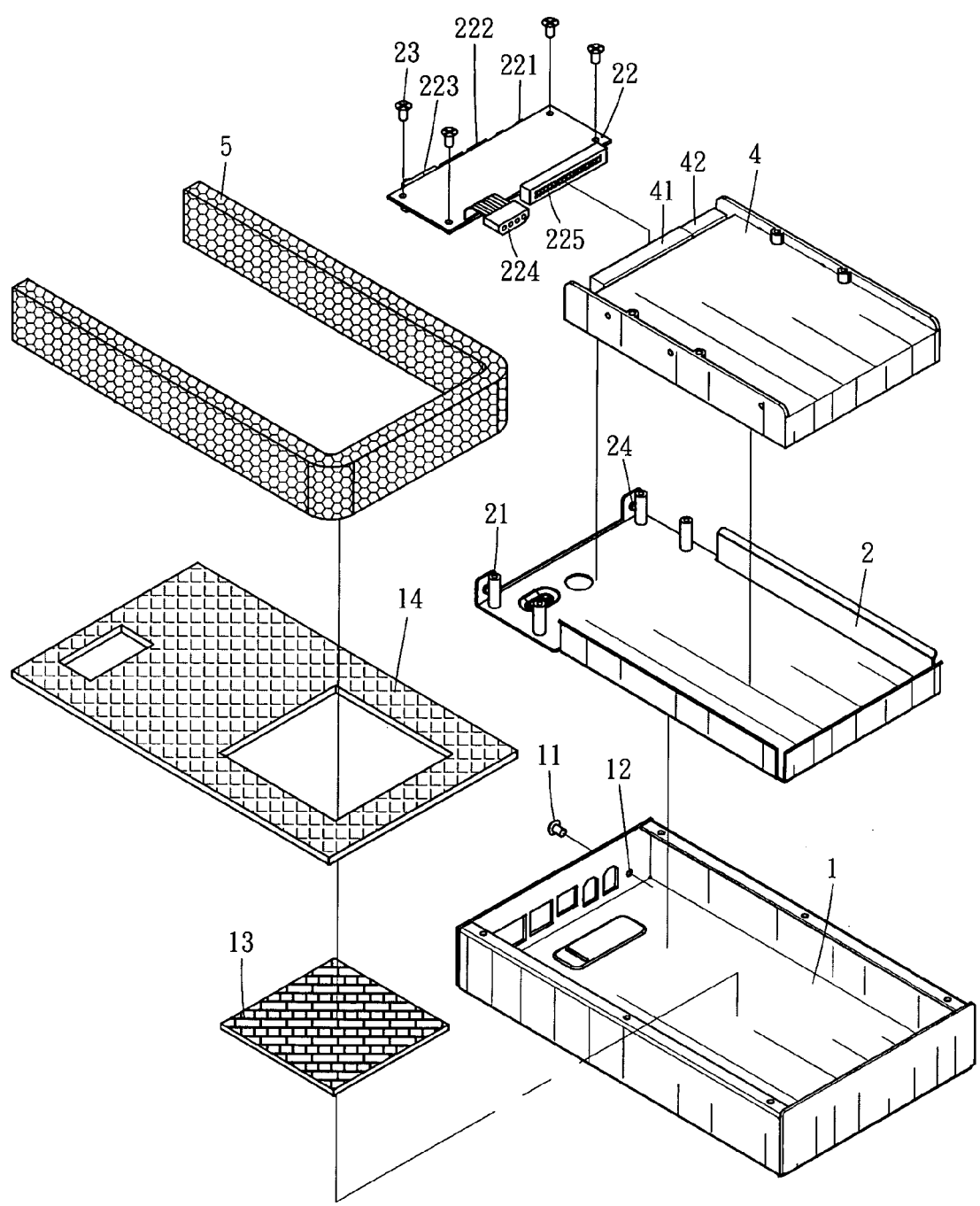
FIG. 6 is an exploded view of the assembly of the heat socket and the metallic housing of the present invention.

As shown in FIGS. 5 and 6, the heat socket 2 is basically made of a metallic material with good heat conduction. The front end is provided with a screwing pillar 21 for affixing a circuit board 22 on the heat socket 2 with a screw 23. One end of the circuit board 22 includes a power input connector 221, a signal input connector 222 and a switch 223; the other end includes a power connector 224, a signal connector 225 connecting to a power connector 41 and a signal connector 42 of the hard drive 4. After the power and signal are connected, the hard drive 4 can be screwed on the heat socket 2.

The front end of the heat socket 2 is provided with a screwing hole 24 so that the heat socket 2 supporting the hard drive 4 can be secured in the reserved space inside the metallic housing 1 by passing the screw 11 through the screwing hole 12 of the metallic housing 1 to the screwing hole 24.

The metallic housing 1 and the heat socket 2 for the fixed hard drive are tightly coupled such that heat absorbed by the heat socket can be dissipated via the metallic housing.

The inner rim of the above-mentioned metallic housing 1, corresponding to the heat source of the hard drive 4, is provided with a high heat conductive material or a high heat conductive medium 13 capable of absorbing vibration, enhancing qualitative fit, and conducting heat. The soft high heat conductive material or the high heat conductive medium 13 is surrounded with a vibration absorption material 14, and the soft high heat conductive material or the high heat conductive medium 13 and the vibration absorption material 14 are located between the metallic housing 1 and the heat socket 2.

Figure 7:
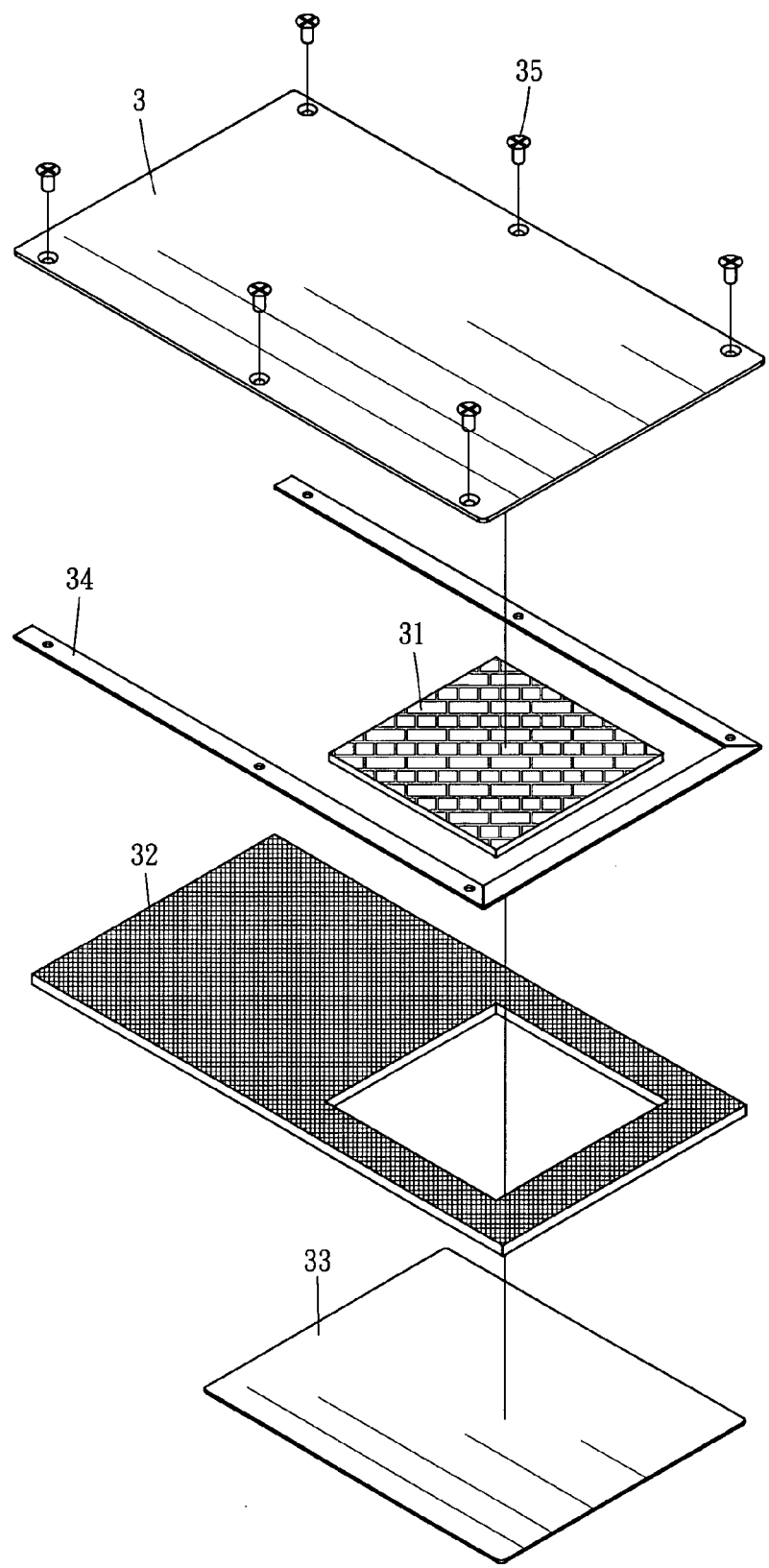
FIG. 7 is an exploded view of the heat board of the present invention.

As shown in FIG. 7, the bottom of the metallic housing 1 is provided with a heat board 3 made of a metallic material. The inner rim corresponding to the heat source of the hard drive 4 is similarly provided with a soft high heat conductive material or a high heat conductive medium 31 capable of absorbing vibration absorption, enhancing quantitative fit, and conducting heat. The soft high heat conductive material or the high heat conductive medium 31 is surrounded with a vibration absorption material 32. A heat board 33 and a silicon gasket 34 can also be added as desired. The heat board 3 is affixed on the bottom of the metallic housing 1 by a screw 35.

Figure 8:
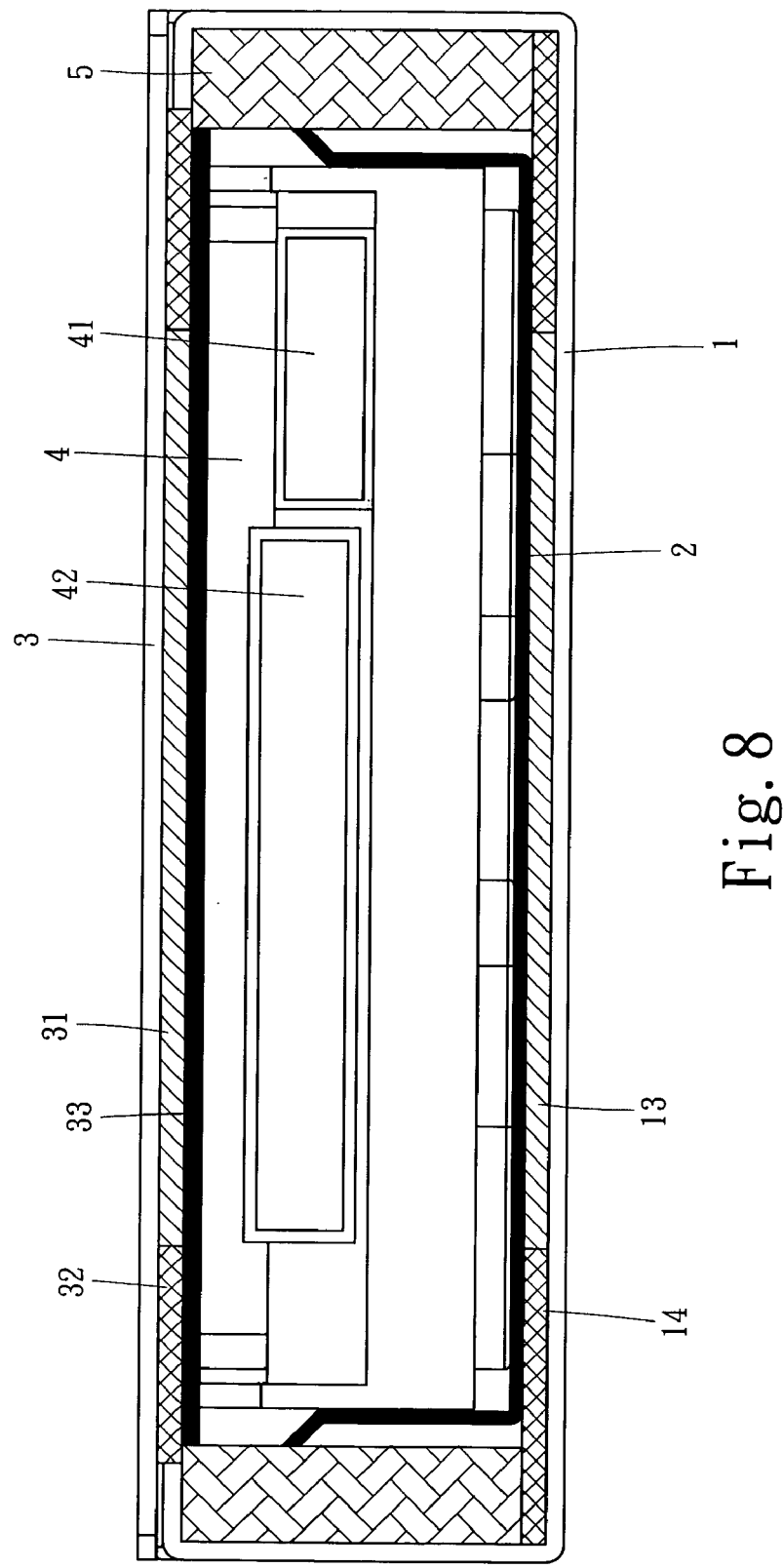
FIG. 8 is a cross-sectional view of the present invention.

As shown in FIG. 8, the heat socket 2 can effectively absorb the heat generated by the running of the hard drive 4 as mentioned above. The heat can also be conducted to the metallic housing 1, 1', 1" by contacting the high heat conductive material or the high heat conductive medium 13 so as to dissipate heat effectively. Through the contact with the soft high heat conductive material or the high heat conductive medium 31, heat can be absorbed and conducted to the heat board 3 and be subsequently dissipated via the heat board 3.

Additionally, the gap spaces surrounding the heat socket 2 and the metallic housing 1, 1', 1" can be inserted with a sound absorption material 5 so that the heat generated by the running of the hard drive can be absorbed by the heat socket 2 and the high heat conductive material or the high heat conductive medium 13, 31 as well as be conducted to the metallic housing 1, 1', 1" and the heat board 3 so as to dissipate heat as well as absorb vibration so a to protect the hard drive 4. The sound absorption material 5 can absorb sound so as to obtain great capabilities in heat dissipation, vibration absorption, and sound absorption.

What is claimed is:

1. A computer hard drive heat dissipation device for a hard drive comprising:
   a) a metallic housing having:
      i) an interior;
      ii) an opening on a top thereof; and
      iii) a first high heat conductive material;
   b) a heat socket located in the interior of the metallic housing and having a circuit board electrically connected to the hard drive, the first high heat conductive material is located between the heat socket and the interior of the metallic housing; and
   c) a heat board removable connected to the metallic housing covering the opening therein and having a second high heat conductive material,
wherein the first high heat conductive material and the second high heat conductive material conducting heat from the interior of the metallic housing to the metallic housing and the heat socket wherein the circuit board is connected to a screwing pillar of the heat socket.

2. The computer hard drive heat dissipation device according to claim 1, wherein the circuit board has a first power connector and a first signal connector, the first power connector is connected to a second power connector of the hard drive, and the first signal connector is connected to a second signal connector of the hard drive.

3. The computer hard drive heat dissipation device according to claim 1, further comprising a first vibration absorption material surrounding the first high heat conductive material, and a second vibration absorption material surrounding the second high heat conductive material.

4. The computer hard drive heat dissipation device according to claim 1, wherein the heat socket is connected to the metallic housing.

5. The computer hard drive heat dissipation device according to claim 1, further comprising a sound absorption material located on side walls of the interior of the metallic housing.

6. A computer hard drive heat dissipation device for a hard drive comprising:
   a) a metallic housing having;
      i) an interior;
      ii) an opening on a top thereof; and
      iii) a first high heat conductive material;
   b) a heat socket located in the interior of the metallic housing and having a circuit board electrically connected to the hard drive, the first high heat conductive material is located between the heat socket and the interior of the metallic housing; and
   c) a heat board removable connected to the metallic housing covering the opening therein and having a second high heat conductive material,
wherein the first high heat conductive material and the second high heat conductive material conducting heat from the interior of the metallic housing to the metallic housing and the heat socket, wherein the circuit board includes a power input connector, a signal input connector, and a switch.

7. The computer hard drive heat dissipation device according to claim 6, wherein the circuit board has a first power connector and a first signal connector, the first power connector is connected to a second power connector of the hard drive, and the first signal connector is connected to a second signal connector of the hard drive.

8. The computer hard drive heat dissipation device according to claim 6, further comprising a first vibration absorption material surrounding the first high heat conductive material, and a second vibration absorption material surrounding the second high heat conductive material.

9. The computer hard drive heat dissipation device according to claim 6, wherein the heat socket is connected to the metallic housing.

10. The computer hard drive heat dissipation device according to claim 6, further comprising a sound absorption material located on side walls of the interior of the metallic housing.

11. A computer hard drive heat dissipation device for a hard drive comprising:
    a) a metallic housing having:
       i) an interior;
       ii) an opening on a top thereof; and
       iii) a first high heat conductive material;
    b) a heat socket located in the interior of the metallic housing and having a circuit board electrically connected to the hard drive, the first high heat conductive material is located between the heat socket and the interior of the metallic housing; and
    c) a heat board removable connected to the metallic housing covering the opening therein and having a second high heat conductive material, wherein the first high heat conductive material and the second high heat conductive material conducting heat from the interior of the metallic housing to the metallic housing and the heat socket, further comprising a silicon gasket located between the metallic housing and the heat board.

12. The computer hard drive heat dissipation device according to claim 11, wherein the circuit board has a first power connector and a first signal connector, the first power connector is connected to a second power connector of the hard drive, and the first signal connector is connected to a second signal connector of the hard drive.

13. The computer hard drive heat dissipation device according to claim 11, further comprising a first vibration absorption material surrounding the first high heat conductive material, and a second vibration absorption material surrounding the second high heat conductive material.

14. The computer hard drive heat dissipation device according to claim 11, wherein the heat socket is connected to the metallic housing.

15. The computer hard drive heat dissipation device according to claim 11, further comprising a sound absorption material located on side walls of the interior of the metallic housing.

* * * * *